(12) United States Patent
Monakhov et al.

(10) Patent No.: US 11,216,566 B1
(45) Date of Patent: Jan. 4, 2022

(54) SYSTEM AND METHOD FOR ENCRYPTION OF EPHEMERAL STORAGE

(71) Applicant: Virtuozzo International GmbH, Schaffhausen (CH)

(72) Inventors: Dmitry Monakhov, Moscow (RU); Pavel Emelyanov, Moscow (RU); Alexey Kobets, Seattle, WA (US)

(73) Assignee: Virtuozzo International GmbH, Schaffhausen (CH)

( * ) Notice: Subject to any disclaimer, the term of this patent is extended or adjusted under 35 U.S.C. 154(b) by 191 days.

(21) Appl. No.: 16/731,381

(22) Filed: Dec. 31, 2019

(51) Int. Cl.
| *H04L 9/00* | (2006.01) |
| *H04L 9/08* | (2006.01) |
| *G06F 21/60* | (2013.01) |
| *G06F 21/62* | (2013.01) |
| *G06F 11/14* | (2006.01) |

(52) U.S. Cl.
CPC ........ *G06F 21/602* (2013.01); *G06F 11/1461* (2013.01); *G06F 21/6218* (2013.01); *H04L 9/0863* (2013.01); *H04L 9/0891* (2013.01); *G06F 2201/84* (2013.01)

(58) Field of Classification Search
CPC .............. G06F 21/602; G06F 11/1461; G06F 21/6218; G06F 2201/84; H04L 9/0863; H04L 9/0891
See application file for complete search history.

(56) References Cited

U.S. PATENT DOCUMENTS

| 9,588,790 | B1* | 3/2017 | Wagner | G06F 11/3668 |
| 2010/0281083 | A1* | 11/2010 | Purtell, II | G06F 16/122 |
| | | | | 707/822 |
| 2015/0319151 | A1* | 11/2015 | Chastain | H04W 12/35 |
| | | | | 713/171 |
| 2017/0177872 | A1* | 6/2017 | McLean | G06F 9/4401 |
| 2018/0351870 | A1* | 12/2018 | Chen | G06F 16/14 |
| 2020/0021445 | A1* | 1/2020 | Caceres | H04L 9/3218 |
| 2020/0034254 | A1* | 1/2020 | Natanzon | G06F 11/2094 |
| 2020/0193044 | A1* | 6/2020 | Dyvadheenam | H04L 63/0428 |
| 2021/0103392 | A1* | 4/2021 | Murray | H04L 9/083 |

* cited by examiner

*Primary Examiner* — Gary S Gracia
(74) *Attorney, Agent, or Firm* — Arent Fox LLP; Michael Fainberg

(57) ABSTRACT

Disclosed are systems and methods for encryption of an ephemeral layer of one or more containers. An exemplary method comprises detecting a container starting execution in an operating system, generating a temporary encryption key and storing the temporary encryption key in memory of a kernel of the operating system, creating an encrypted area as the ephemeral layer in a storage device, the encrypted area accessible only by the container, providing to the container access to the encrypted area, and responsive to stopping execution of the container, destroying the temporary encryption key.

14 Claims, 5 Drawing Sheets

SYSTEM AND METHOD FOR ENCRYPTION OF EPHEMERAL STORAGE

FIELD OF TECHNOLOGY

The present disclosure relates generally to the field of security in virtual execution environments and, more specifically, to systems and methods for encryption of ephemeral storage.

BACKGROUND

Some technologies provide for container runtime instances (e.g., Docker® or the like) that provide microservices. The lifetime of these instances are short and ends with instance destruction. If a container writes data to a physical or virtual disk during its uptime, then on shutdown this data must be deleted. However, in some situations a container instance has been destroyed (e.g., its execution stopped) but the container data is still available on disk and can be openly read by entities apart from the container. This is a major security concern for a container user who does not want data stored on disk being available to third parties.

Accordingly, aspects of the methods and systems described in this disclosure improve protection and security of container data, isolating the data from outside parties.

SUMMARY

Systems and methods are disclosed herein for encryption of ephemeral storage in containers.

An exemplary method for encryption of ephemeral storage in containers, the method comprising detecting a container starting execution in an operating system, generating a temporary encryption key and storing the temporary encryption key in memory of a kernel of the operating system, creating an encrypted area as the ephemeral layer in a storage device, the encrypted area accessible only by the container, providing to the container access to the encrypted area, and responsive to stopping execution of the container, destroying the temporary encryption key.

In one aspect, an exemplary system comprises a hardware processor configured to: detect a container starting execution in an operating system, generate a temporary encryption key and store the temporary encryption key in memory of a kernel of the operating system, create an encrypted area as the ephemeral layer in a storage device, the encrypted area accessible only by the container, provide to the container access to the encrypted area, and responsive to stopping execution of the container, destroy the temporary encryption key.

In one aspect, a non-transitory computer-readable medium is provided, storing instructions thereon for encryption of ephemeral storage in containers, the instructions for detecting a container starting execution in an operating system, generating a temporary encryption key and storing the temporary encryption key in memory of a kernel of the operating system, creating an encrypted area as the ephemeral layer in a storage device, the encrypted area accessible only by the container, providing to the container access to the encrypted area, and responsive to stopping execution of the container, destroying the temporary encryption key.

In one aspect, the method further comprises: upon a request from one container of the plurality of containers to access the encrypted area, determining whether the one container has access to the temporary encryption key, and responsive to determining that the one container has access, allowing the one container to access the encrypted area, otherwise returning an error.

In one aspect, the generating the temporary encryption key further comprises: performing a snapshot on a base root file system of the container, performing incremental snapshots of changes to the file system of the container, encrypting an ephemeral layer of the container using the temporary encryption key, and attaching the ephemeral layer to the base root file system of the container.

In one aspect, the encrypted area is an empty subdirectory of the ephemeral layer of the container, and container has read-write access to the encrypted area.

In one aspect, the method further comprises: when the operational request is a read request, decrypting data in the encrypted area after access is allowed, and when the operational request is a write request, encrypting the data in the encrypted area after access is allowed.

In one aspect, the temporary encryption key is stored in the kernel memory, not written to a physical disk and is inaccessible by processes in the user space of the container.

In one aspect, the method further comprises: assigning each of the plurality of containers a corresponding encryption key.

In one aspect, the method further comprises: assigning each of the plurality of containers a different method of encryption for performing the request in the encrypted area.

In one aspect, the method further comprises: providing the container with an identifier for the temporary encryption key.

In one aspect, each layer of a file system of the container is a pseudo block device, each layer being a snapshot of a previous layer, and the pseudo block device representing each layer is encrypted.

In one aspect, each directory in a tree of subdirectories of the file system is encrypted.

In one aspect, the method further comprises: when the container is considered alive, storing the temporary encryption key in RAM of a host machine hosting the container.

In one aspect, the method further comprises: while the container is considered alive until it is explicitly destroyed, preserving the temporary encryption key outside of RAM of a host machine hosting the container.

In one aspect, the method further comprises: securing the temporary encryption key using a key management that stores all generated keys, and providing the generated keys to trusted parties.

In one aspect, the method further comprises: writing the temporary encryption key to a location in local storage, encrypting the location with a slow encryption algorithm with a generated key, and protecting the generated key.

In one aspect, the method further comprises: destroying the container, and destroying the encrypted area.

In one aspect, the method further comprises: attaching the encrypted area as snapshot changes storage for the container root file system.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for encryption of ephemeral storage in containers. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following concepts are used throughout the specification, drawings and claims.

A Virtual Execution Environment (VEE) is a type of isolated environment that supports program code execution, where at least a part of the real hardware or software utilized for running program code are presented as their virtual analogs. From the point of view or the user, that the code in VEE runs as if it were running on the real computing system. Examples of VEEs can be any kind of virtual machines (VMs, including lite VMs), containers (including OS containers, stateless containers, or execution containers), and the like.

A Virtual Machine (VM) is a type of an VEE running on the same physical machine simultaneously, wherein hardware resources are virtualized. Each Virtual Machine instance executes its own OS kernel (i.e., guest OS kernel). Support of Virtual Machines is implemented using a Virtual Machine Monitor and/or a Hypervisor.

A container (CT) is one type of a Virtual Execution Environment running on the same hardware system, where containers share operating system (OS) kernel and at least some of the system resources, and where isolation of containers is implemented on the namespace level. In some aspects, a container is defined as an isolated namespace. In some aspects, multiple sets of application services are organized on a single hardware system by placing them into isolated containers.

According to one aspect of the disclosure, an application refers to a set of instructions written in an interpreted language and an interpreter which executes it. In another aspect, (e.g., in the case of a compiled language) an application refers to a precompiled binary created from a set of instructions.

Figure 1:
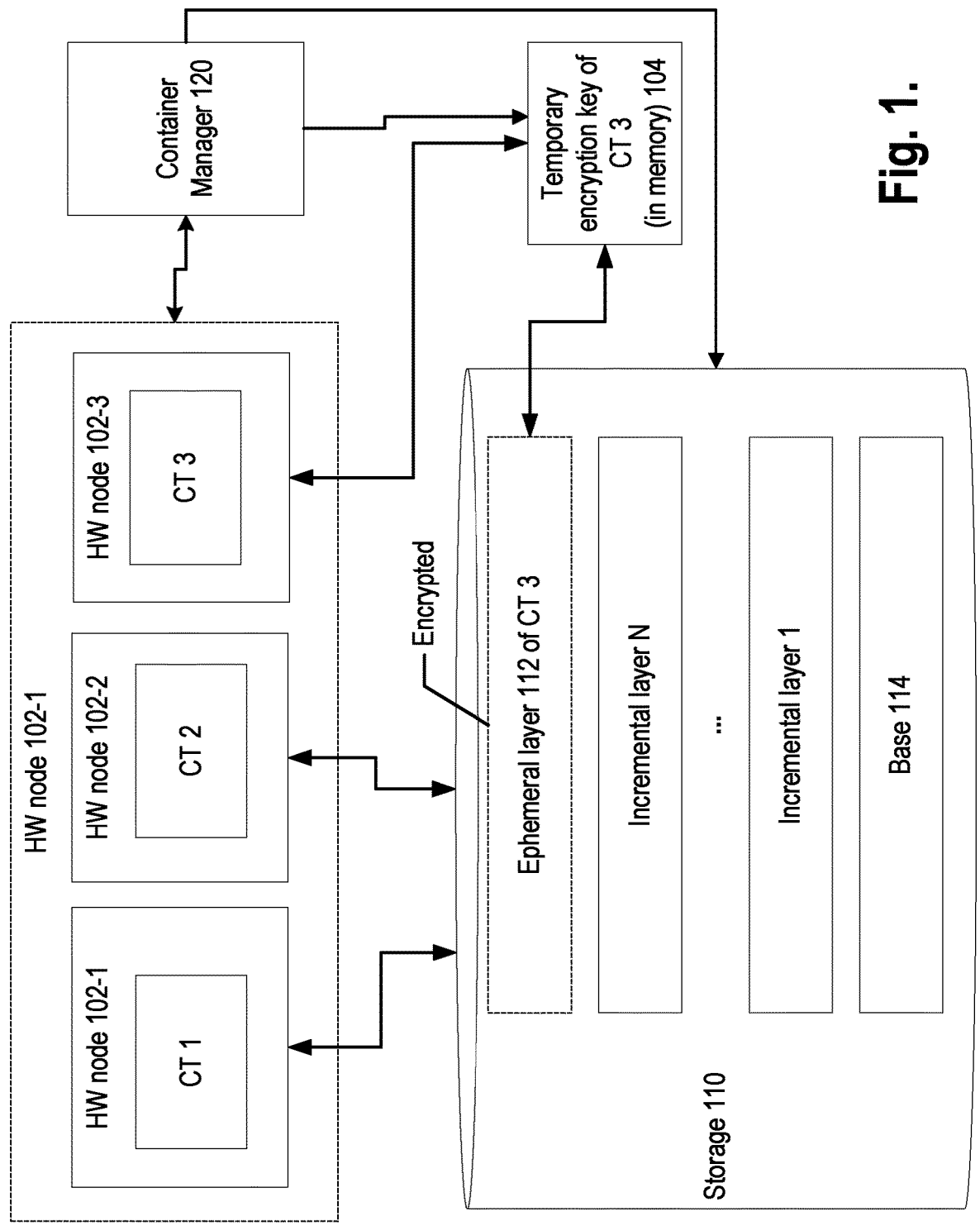
FIG. 1 illustrates a block diagram of an exemplary architecture for a system for encryption of ephemeral storage in containers, according to exemplary aspects of the disclosure.

FIG. 1 illustrates a block diagram of an exemplary architecture for a system 100, according to exemplary aspects of the disclosure. The distributed system (where different containers and the storage are located in different hardware nodes) is shown on the figure, though in some aspects the storage can be on the same hardware node with the container that uses the storage, in some aspects the whole system may be on the same node. In some aspects, a container can run inside of a VM.

In exemplary aspects of the disclosure, on container start (e.g., container 1 executing on hardware node 102-1, container 2 executing on hardware node 102-2, or container 3 executing on hardware node 102-3), encryption (e.g., by encrypting ephemeral layers corresponding to containers) is added on top of the container storage (alternatively referred to as disk) in storage 11 associated with the containers 1 to 3, with a temporary key 104. The temporary key 104 is stored only in kernel memory and is, in some aspects, never written on disk 110. In some alternative aspects, the key may be stored in encrypted key management system. According to one aspect, the kernel memory is kernel memory of an operating system executing a container, e.g., container 3. The temporary key 104 is used while a container instance is running on a hardware node. After the container instance is stopped from execution (e.g., the instance is destroyed), the temporary key 104 is removed and even if container data is still stored on disk 110, the data is encrypted. In some aspects of the disclosure, only the top "ephemeral" layer 112 of the container in the storage 110 is encrypted. In other words, only private data that a container generates during its uptime is stored in the ephemeral layer 112, and only the private data is encrypted. In some aspects, the ephemeral layer is the top-most layer which is empty at the beginning of container execution; the container has read-write access to it (unlike the other layers) and is encrypted (as shown on FIG. 1). In some aspects, the ephemeral layer is a temporary layer that exists only when the container runs.

According to some exemplary aspects, an ephemeral layer (e.g., ephemeral layer 112 of container 3) exists only along with a container during the containers life. Other layers do not contain private user data. For example, FIG. 1 illustrates a base layer (also referred to as root file system) 114, and an incremental layer 1 to an incremental layer N (which sometimes are also referred as parts of container root file system) which do not contain private user data that should be protected from others. E.g., in some aspects, when a container management system creates the root FS for the container it creates it by mounting the set of "layers" on top of each other. The ephemeral layer (also referred to as temporary layer) 112 does not include container data, but contains data generated or stored by a managed application executing in the container. Data relating to the container itself is represented by a separately attached volume, which, in some aspects is encrypted. In one aspect, an ephemeral layer is a subdirectory of a file system on storage 110 that stores various temporary files that a container generates on top of its base root file system (FS) 114. In one aspect, when the container starts, a snapshot of the base root FS is taken, so that all changes are stored not in the base image, but rather in a small additional delta. So, changes in the file system are saved in an additional delta (e.g., ephemeral layer). In one example aspect, the additional delta storage files may comprise sensitive data. In this exemplary aspect, the ephemeral layer 112 is encrypted to make data stored therein unavailable for other users to access.

In other words, there are at least two layers in the storage 110: an encrypted temporary (ephemeral) layer 112 and a base layer 114. According to exemplary aspects, one, both or neither of these layers may be block devices. In one aspect, each layer is a pseudo block device each being a snapshot of the previous one, in this case, encryption applies to the whole block device that represents the layer. In another aspect, a file system is used to keep the layers as sub-directories, and a overlayfs is used to join the layers, in this case, encrypted is the subdirectory that keeps the respective layer.

In an exemplary aspect, subdirectories on a file system may be arranged as follow (e.g., in a UNIX-style operating system):

/
-/tmp layer (i.e., ephemeral layer)
-/base image (e.g., base layer 114)

In some aspects, all writes performed by the container go to the temporary layer that stores all changes made by a container during the lifetime of the container. The base image, however, remains unchangeable (e.g., the base image is read-only). According to this aspect, the base image is public (i.e., can be used by several containers, e.g., containers 1-3 shown in FIG. 1, similar to OS images) and does not contain sensitive user data. When the container need to access, the system first inspects the temporary layer 112 and if the data is not found, only then inspects the base layer 114.

In the system 100, a key management system is not required because a temporary key is generated once for each container and remains in use for a long period of time (e.g., for the length of a container lifetime). The temporary key is a randomly generated key generated by container management system, e.g., container manager 120 (or by the OS kernel in some aspects). The container manager 120 handles instantiation, destruction and resource allocation for all containers 1, 2 and 3, e.g. those executing on hardware nodes 102-1, 102-2 and 102-3, etc. According to one aspect, only the data that belongs to the ephemeral layer 112 is encrypted using encryption algorithms of any complexity (even the simple ones like xor). In one aspect, different encryption algorithms can be used for different containers. For example, container 1 on hardware node 102-1 may use a different encryption algorithm for the associated ephemeral layer than the encryption algorithm used for ephemeral layer 112 of container 3. Temporary key 104 for container 3 is generated in an OS kernel and is unavailable outside of the OS kernel, and exists only while the associated container is running.

In one scenario, an attack vector may be described as follows: A container is stopped but the container data is still stored on a server's storage. For example, aspects of the present disclosure protect private container level data even when a physical server is shut down and stolen. If a server is physically stolen, no one will gain access to sensitive user data as the temporary key is destroyed (e.g., containers executing thereon are destroyed, or, stop executing) once the server is shut down. The sensitive user data is decrypted only while a container is running and encrypted when the container is stopped.

One example illustrates the processing of sensitive data from a protected layer in storage. In this example, an application executing in container 3 may retrieve sensitive data from the ephemeral layer 112 on storage device 110. The sensitive data is then processed and stored back in the storage device 110 by the application. A user may desire that the sensitive data not be accessible by untrusted parties during container uptime or after the container shuts down, thus the ephemeral layer 112 is encrypted using key 104. Aspects of the present disclosure may be applied to photo compression, software compilation on a shared server, e-mail spam filters, or data privacy guarantees on borrowed hardware, amongst other uses.

According to one aspect, a performance improvement can be achieved. Modern data processing systems require safety standards that include memory flush and data removal. In aspects of the present disclosure, sensitive data that is required by such safety standards to be removed, are encrypted and can be deleted in a simple manner (e.g., we do not need to overwrite data to avid its reading by third party) because this data cannot be recovered. For example, the way this removal is done affects the data availability too. E.g. files may be just "unlinked" as it's done be default by the majority of modern file systems. Unlinking means that data blocks are marked as "unused", but the data in it is still there. Another e.g. COW/UBI storages may remap data blocks, so that the block seems to be unused, but in reality its contents is still stored somewhere. Yet another e.g. is—magnetic disks has a lite "memory" effect, which is even if you overwrite the data into a block, its old contents still may be read. Encrypting the ephemeral layer depreciate all these read possibilities, even if someone manages to read the data, it happens to be encrypted and thus meaningless for the reader.

This is especially concerning because there is no guarantee that on container shut-down the sensitive data will be deleted. In a system with redundancy, without aspects of the present disclosure being implemented, data from all disks must be deleted because the sensitive data is replicated across several disks. Using aspects of the present disclosure, disk (for example, a solid state disk) lifetime may be extended by avoiding excessive writes to the disk for deletion, instead merely encrypting the data and deleting the temporary key so the data can never be decrypted.

Figure 2:
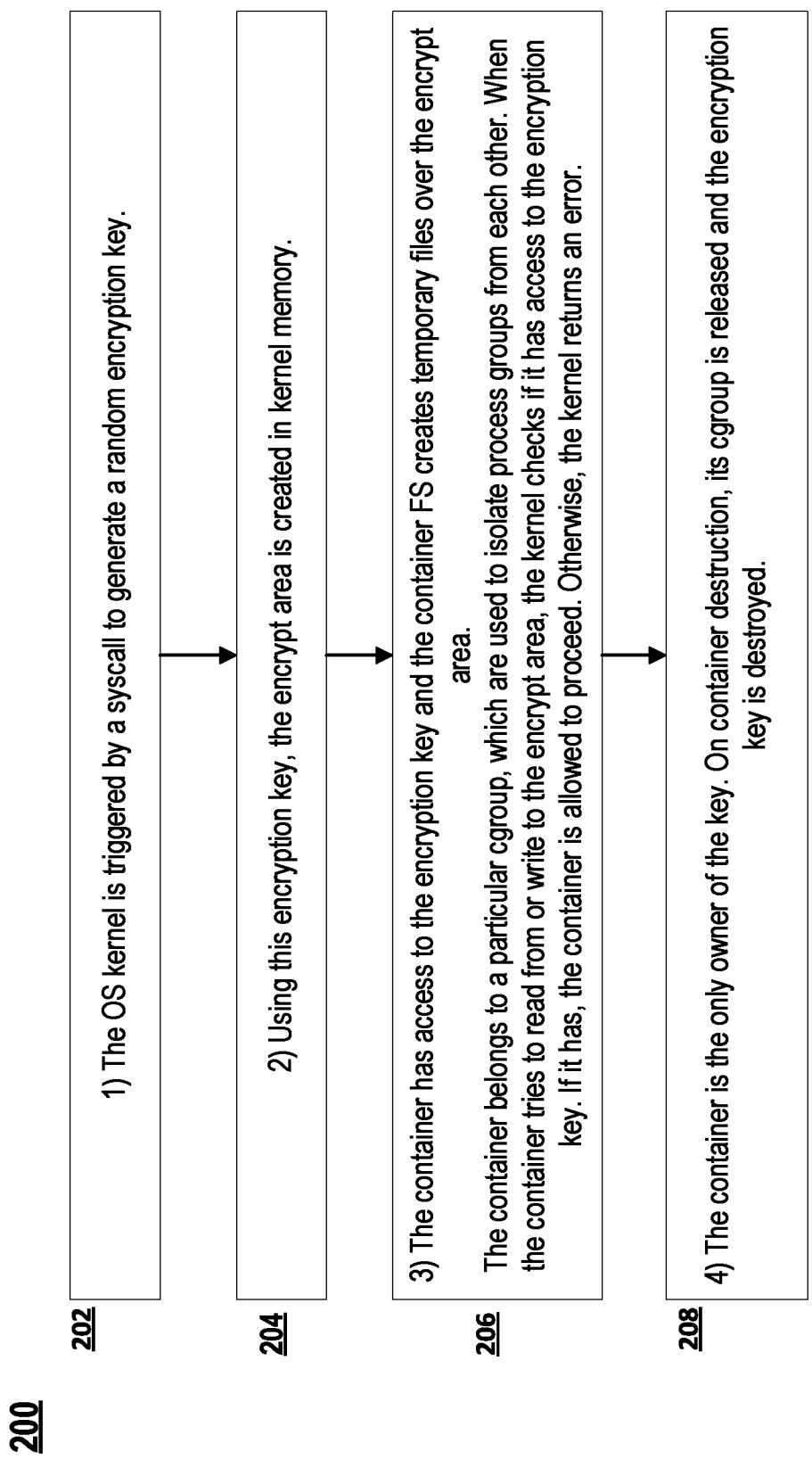
FIG. 2 is a flow diagram illustrating a method for encryption of ephemeral storage, according to exemplary aspects of the disclosure.

FIG. 2 is a flow diagram illustrating a method for encryption of ephemeral storage, according to exemplary aspects of the disclosure.

Portions of the system 100 are exemplary implementations of the method 200 as executed by the processor 21 in computer system 20, in some aspects of the present disclosure.

The method 200 begins step 202. At step 202. a random encryption key is generated and protected from access from any subsystem, but the layer file system driver. E.g., the operating system (OS) kernel is triggered by a system call to generate a random encryption key. The encryption key is then stored only in kernel memory, according to some aspects of the present invention.

In some aspects, the encryption key exists only during the container lifetime. In some aspects however, the container is considered "alive" until the container is explicitly destroyed. In this aspect, in the case of a hardware node reboot, all containers that were running are restarted, and keys for top-layer (the ephemeral layers) are preserved outside of RAM of the hardware node, but still kept in a secured location (e.g., also encrypted, e.g., by different kind of encryption). In this aspect, one way to securely store the key is to use a special key management system that stores all the keys for each container and only returns the keys to trusted parties. Another way to securely store the keys in this aspect is write the keys into a random key storage location, such as a file on disk, a sub-directory or a partition. This location is encrypted with a stronger and slower encryption algorithm than the algorithm used for the ephemeral layer encryption. The key for this encryption is protected, even from a container management system.

The method 200 then proceeds to step 204, where, using the encryption key, the encrypted area is created as the ephemeral layer. In some aspects, the encrypted area may be an empty subdirectory which is encrypted using the encryption key (e.g., the temporary key 104). The encrypted area may be created on a file system (e.g. file systems such as ext4, encrypt FS, and the like, which support the creation of encrypted directories). Later all content that will be written to the subdirectory will be encrypted using the encryption key.

Subsequently, the method proceeds to step 206 where the container has access to the encryption key identifier (ID) and the container file system creates temporary files over the encrypted area.

According to an exemplary aspect, a container management system creates the root file system for the container by mounting a set of layers on top of each other. The top-most layer is the temporary ephemeral layer (e.g., layer 112 in FIG. 1) and is a) empty, b) read-write (unlike the other layers), and c) encrypted. The top-most layer is used by the container to store files generated by applications in the container. Once the container is "down" (requested to be destroyed, no longer in use, or rebooted), the top-most layer is destroyed, thus the layer is referred to as an ephemeral, or temporary, layer.

The encryption of the ephemeral layer is performed with a randomly-generated key that is stored in the kernel and is not accessible directly by processes executing in user space of a hardware node. Instead, the container management system (e.g., container manager 120 of FIG. 1) asks the kernel to create (generate) the key and the container receives the key ID. Subsequently, an empty layer is created and the container requests the kernel to mount the layer and encrypt it with the key based on the encryption key ID, creating the ephemeral layer. In some aspects, no entity but the kernel has access to the key. The container, management system (in some aspects, where it is not part of the kernel), user, admin, whatever else only can have the key ID. The key itself is only visible be the kernel.

In one aspect, when container is starting, it obtains information (e.g., from config file, etc.) about where its different data is and should be stored, including that all sensitive data (or even all data that container writes to disk) should be stored in encrypted area. In one aspect, on container destruction the encryption key is destroyed. Moreover, in cease of power off the key, which is never written to disk, is also destroyed, and so no one will have access to encrypted data. In one aspect, each container has its own key, but in another aspect, a group of related containers can use the same key. In one aspect, where containers are nested the access to the area can also be nested.

Figure 3:
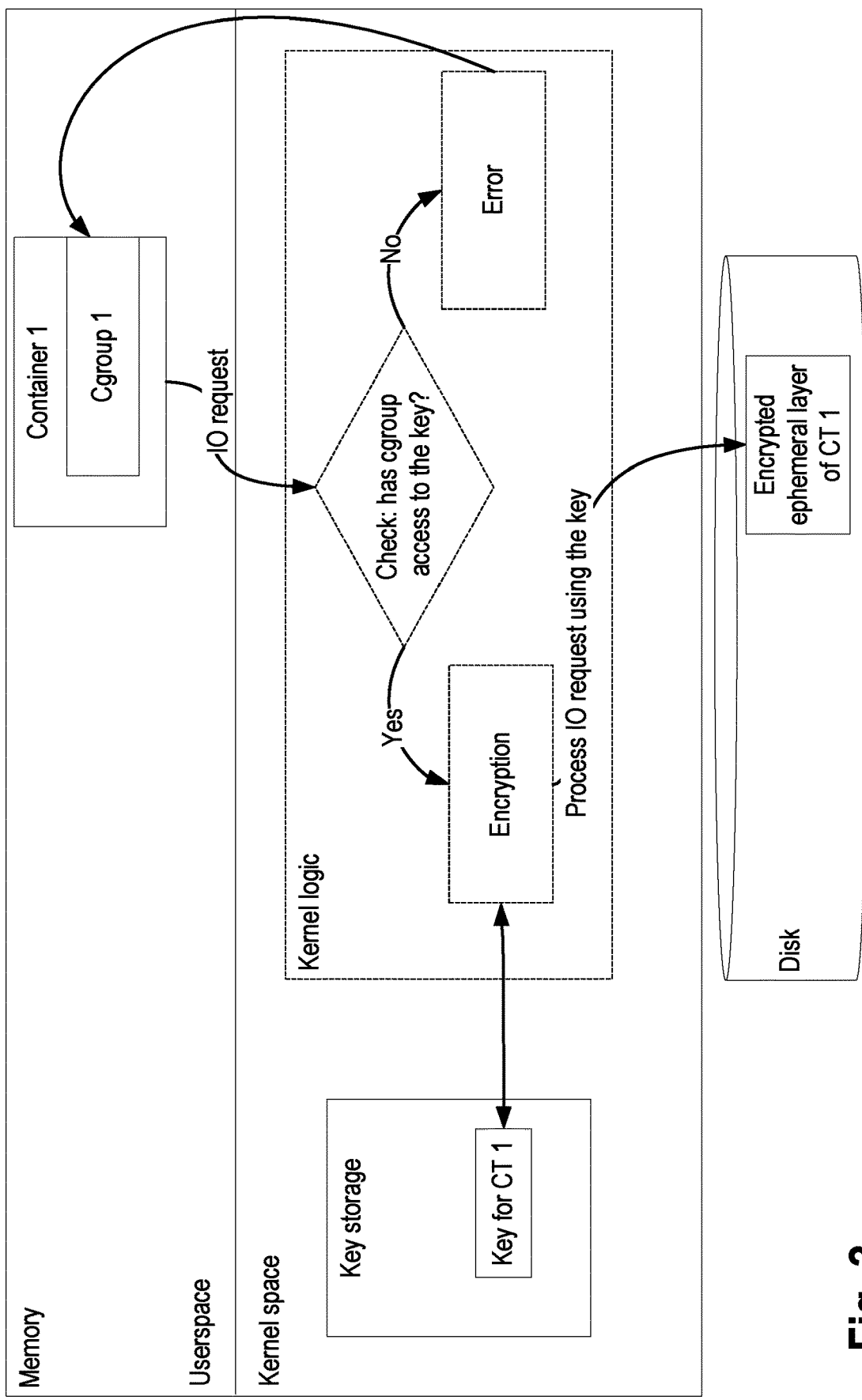
FIG. 3 illustrates a container accessing associated data, according to exemplary aspects of the disclosure.

FIG. 3 illustrates a container accessing associated data, according to exemplary aspects of the disclosure.

In exemplary aspects, a container may seek to write data to the ephemeral layer (e.g., an application in it want to write something to disk). When the container needs to read or write the data to the encrypted area, an 10 request is sent to the kernel of an operating system hosting the container. The kernel, or a kernel component, identifies that the container is attempting to access the encrypted area and determines whether this container is permitted to access the area (or, in some aspects, to a temporary key with which the area was created). In some aspects, the kernel component(s) determines this information by reading the control group information of the container (e.g., cgroup in UNIX based operating systems) to check whether the container is in a group that has access. In some aspects, if the container has access, the kernel permits access and using the corresponding key encrypts and, for example, writes data to ephemeral layer or decrypts and reads data fron the ephemeral storage (depending on the type of required operation). I.e., kernel performs encryption or decryption and provides result to the container. Otherwise, the kernel returns an error.

This check improves container security and prevents other user space components from accessing encrypted layer of the container (which is even more than just preventing accessing it after container is stopped). E.g., if there is another container, which has no access to the key but tries to access (read or write) the encrypted area of the first container, then such second container will get an error.

Figure 4:
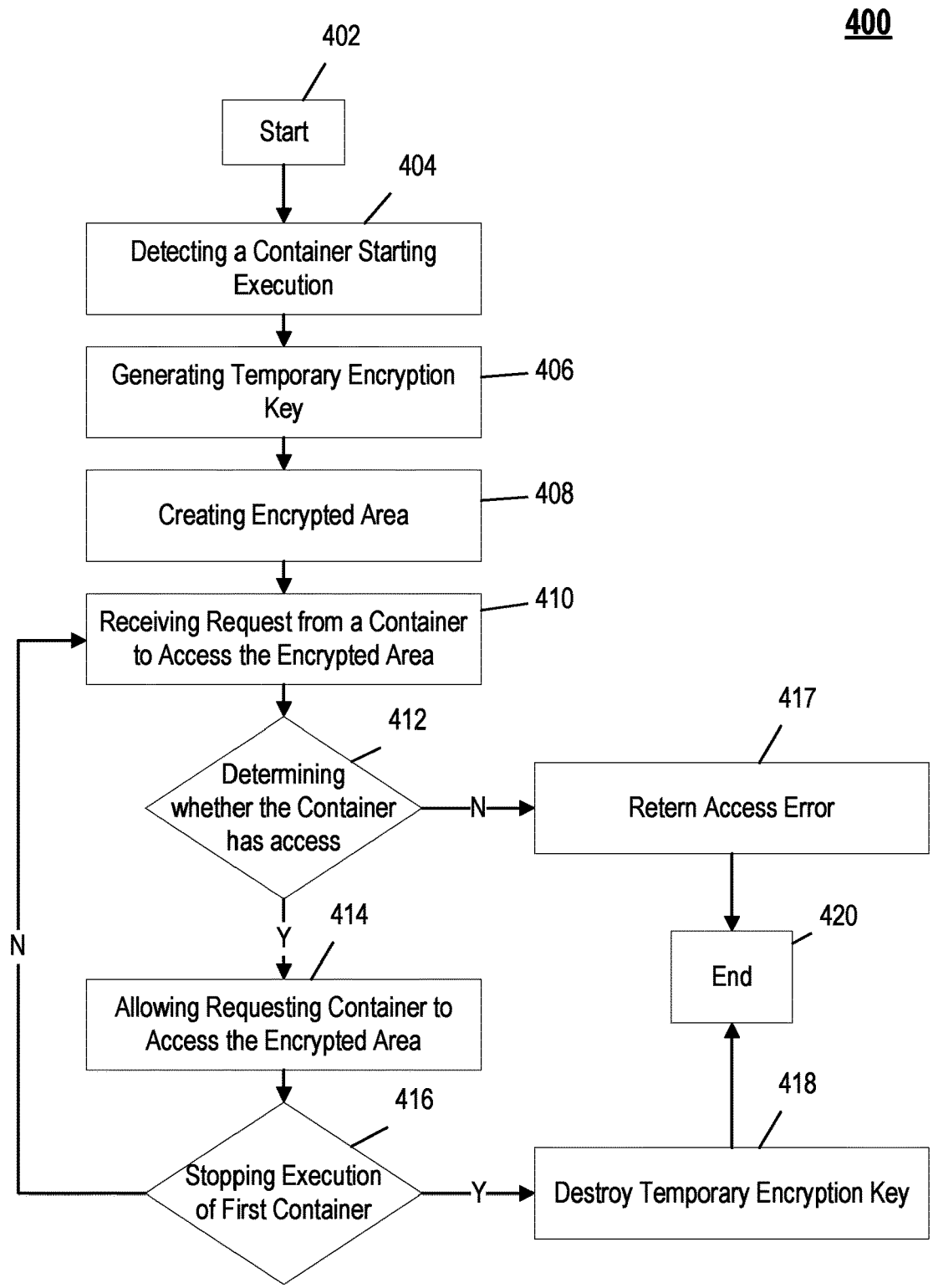
FIG. 4 is a flow diagram for a method of encryption of ephemeral storage, according to exemplary aspects of the disclosure.

FIG. 4 is a flow diagram for a method 400 for encryption of an ephemeral layer of one or more containers, in accordance an exemplary aspect of the present disclosure.

The method begins at 402 and proceeds to 404, where a container manager detects a container starting execution in an operating system.

The method proceeds to 406, where the container manager (or the OS kernel, depending on the aspect) generates a temporary encryption key. In some aspects, the container manager stores the temporary encryption key in memory of a kernel of an operating system where the container manager is executing.

At 408, the container manager creates an encrypted area as the ephemeral layer in a storage device. The encrypted area is only accessible by the container it was created for. In exemplary aspects, the storage device is associated with a hardware node where the container is executing.

At 410, the container manager may receive a request from one container of the plurality of containers to access the encrypted area. At this point, the container manager determines whether the one container has access to the temporary encryption key that was created earlier.

If the container is determined to have access to the encryption key at step 412, the method proceeds to 414, where the container manager permits the one container to access the encrypted area or provides to the container access to the encrypted area.

Otherwise, if the requesting container is not permitted to access the temporary encryption key the method proceeds to 417 where an access error is returned.

After 414, the method proceeds to 416. In step 416, the method determines if the execution is stopped, responsive to stopping execution of the container, the method destroys the temporary encryption key in step 418. In other words, if a request to stop execution of the first container is received, the method destroys the temporary encryption key in step 418, and the method ends at 420. If a stop request is not received in step 416, the method proceeds back to 410, waiting for an access request.

Figure 5:
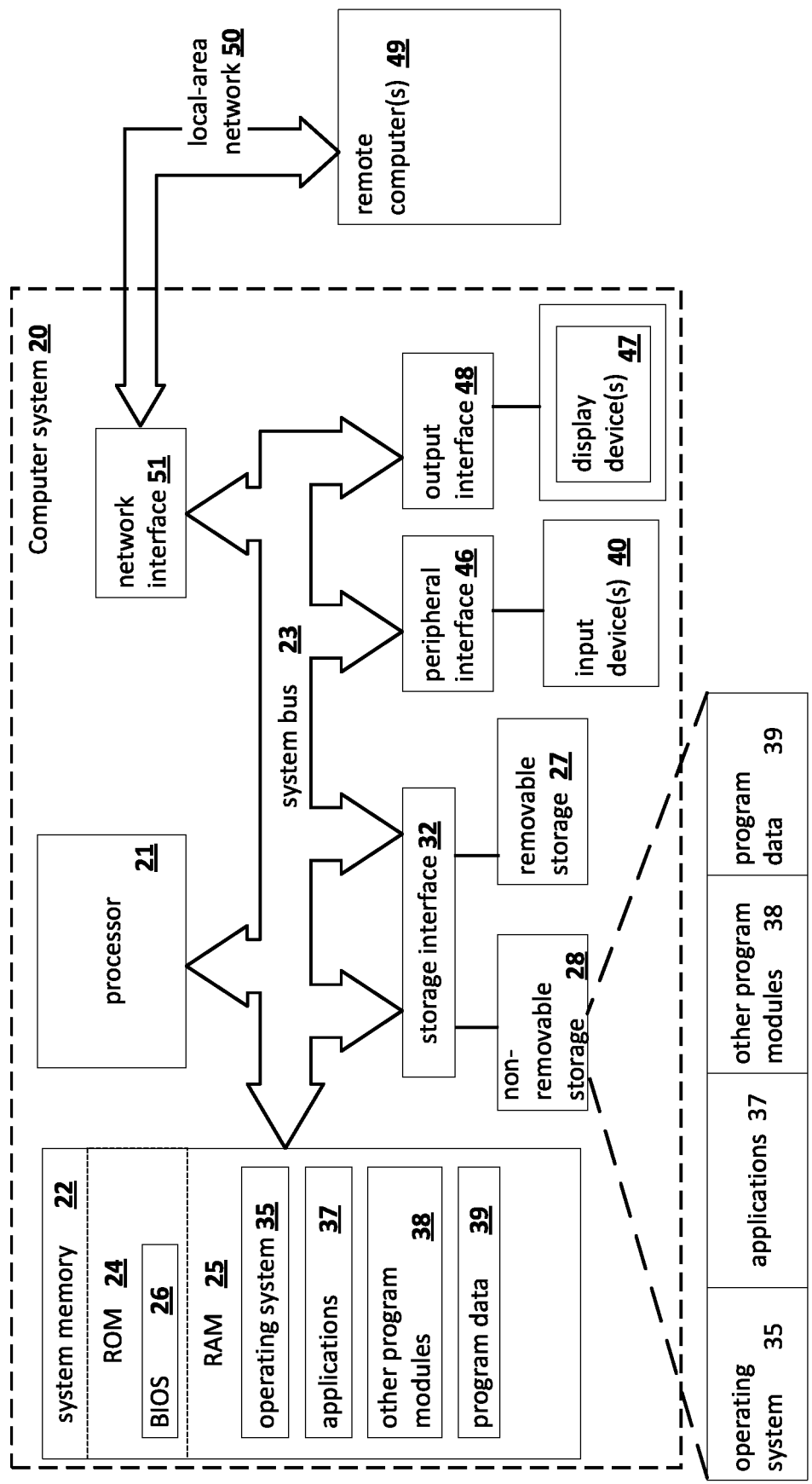
FIG. 5 illustrates a block diagram of a general-purpose computer system on which the disclosed system and method can be implemented according to an exemplary aspect.

FIG. 5 illustrates a block diagram of a general-purpose computer system on which the disclosed system and method can be implemented according to an exemplary aspect. It should be noted that the computer system 20 can correspond to any components of the system 100, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for encryption of an ephemeral layer of one or more containers comprising:
   detecting a container starting execution in an operating system;
   generating a temporary encryption key, wherein generating the temporary encryption key comprises: performing a snapshot on a base root file system of the container;
   performing incremental snapshots of changes to the file system of the container:
   encrypting an ephemeral layer of the container using the temporary encryption key; and
   attaching the ephemeral layer to the base root file system of the container;
   storing the temporary encryption key in memory of a kernel of the operating system;
   creating an encrypted area as the ephemeral layer in a storage device, wherein the encrypted area is an empty subdirectory of the ephemeral layer of the container, and container has read-write access to the encrypted area, and the encrypted area accessible only by the container;
   providing to the container access to the encrypted area; and
   responsive to stopping execution of the container, destroying the temporary encryption key.

2. The method of claim 1, further comprising:
   upon a request from one container of the plurality of containers to access the encrypted area, determining whether the one container has access to the temporary encryption key; and
   responsive to determining that the one container has access, allowing the one container to access the encrypted area, otherwise returning an error.

3. The method of claim 1, further comprising: when the operational request is a read request, decrypting data in the encrypted area after access is allowed; and when the operational request is a write request, encrypting the data in the encrypted area after access is allowed.

4. The method of claim 1, wherein the temporary encryption key is stored in the kernel memory, not written to a physical disk and is inaccessible by processes in the user space of the container.

5. The method of claim 1, further comprising:
   providing the container with an identifier for the temporary encryption key.

6. The method of claim 1, further comprising:
   securing the temporary encryption key using a key management that stores all generated keys; and
   providing the generated keys to trusted parties.

7. The method of claim 1, further comprising: writing the temporary encryption key to a location in local storage; encrypting the location with a slow encryption algorithm with a generated key; and protecting the generated key.

8. The method of claim 1, further comprising:
   destroying the container; and
   destroying the encrypted area.

9. The method of claim 1, further comprising:
   attaching the encrypted area as snapshot changes storage for the container root file system.

10. A system for encryption of an ephemeral layer of one or more containers comprising:
    a memory; and a processor configured to:
    detect a container starting execution in an operating system;
    generate a temporary encryption key, wherein generating the temporary encryption key comprises:
    performing a snapshot on a base root file system of the container;
    performing incremental snapshots of changes to the file system of the container:
    encrypting an ephemeral layer of the container using the temporary encryption key; and
    attaching the ephemeral layer to the base root file system of the container;
    store the temporary encryption key in memory of a kernel of the operating system;
    create an encrypted area as the ephemeral layer in a storage device, wherein the encrypted area is an empty subdirectory of the ephemeral layer of the container, and container has read-write access to the encrypted area, and the encrypted area accessible only by the container;
    provide to the container access to the encrypted area; and
    responsive to stopping execution of the container, destroy the temporary encryption key.

11. The system of claim 10, upon a request from one container of the plurality of containers to access the encrypted area, the processor further being configured to:
    determine whether the one container has access to the temporary encryption key; and
    responsive to determining that the one container has access, allow the one container to access the encrypted area, otherwise return an error.

12. The system of claim 10, the processor further being configured to: when the operational request is a read request, decrypt data in the encrypted area after access is allowed; and when the operational request is a write request, encrypt the data in the encrypted area after access is allowed.

13. A non-transitory computer readable medium storing thereon computer readable instructions for encryption of an ephemeral layer of one or more containers, including instructions for:
    detecting a container starting execution in an operating system;
    generating a temporary encryption key, wherein generating the temporary encryption key comprises:
    performing a snapshot on a base root file system of the container;
    performing incremental snapshots of changes to the file system of the container:
    encrypting an ephemeral layer of the container using the temporary encryption key; and
    attaching the ephemeral layer to the base root file system of the container;
    storing the temporary encryption key in memory of a kernel of the operating system;
    creating an encrypted area as the ephemeral layer in a storage device, wherein the encrypted area is an empty subdirectory of the ephemeral layer of the container, and container has read-write access to the encrypted area, and, the encrypted area accessible only by the container;
providing to the container access to the encrypted area; and
responsive to stopping execution of the container, destroying the temporary encryption key.

14. The non-transitory computer readable medium of claim 13, the instructions further comprising instructions for:
upon a request from one container of the plurality of containers to access the encrypted area, determining whether the one container has access to the temporary encryption key; and
responsive to determining that the one container has access, allowing the one container to access the encrypted area, otherwise returning an error.

* * * * *